(12) United States Patent
McBrearty et al.

(10) Patent No.: US 6,848,077 B1
(45) Date of Patent: Jan. 25, 2005

(54) DYNAMICALLY CREATING HYPERLINKS TO OTHER WEB DOCUMENTS IN RECEIVED WORLD WIDE WEB DOCUMENTS BASED ON TEXT TERMS IN THE RECEIVED DOCUMENT DEFINED AS OF INTEREST TO USER

(75) Inventors: Gerald Francis McBrearty, Austin, TX (US); Shawn Patrick Mullen, Buda, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 658 days.

(21) Appl. No.: 09/616,141

(22) Filed: Jul. 13, 2000

(51) Int. Cl.⁷ .............................................. G06F 17/30
(52) U.S. Cl. ....................................... 715/501.1; 707/3
(58) Field of Search .............................. 707/1–10, 500, 707/501; 715/501.1

(56) References Cited

U.S. PATENT DOCUMENTS

| | | | | |
|---|---|---|---|---|
| 5,752,022 A | * | 5/1998 | Chiu et al. ..................... | 707/10 |
| 5,761,436 A | * | 6/1998 | Nielsen ........................ | 707/101 |
| 5,870,559 A | * | 2/1999 | Leshem et al. ............. | 345/854 |
| 5,958,008 A | * | 9/1999 | Pogrebisky et al. ........ | 709/223 |
| 5,974,572 A | * | 10/1999 | Weinberg et al. ............. | 714/33 |
| 6,088,717 A | * | 7/2000 | Reed et al. .................. | 709/201 |
| 6,182,072 B1 | * | 1/2001 | Leak et al. .................... | 707/10 |
| 6,208,986 B1 | * | 3/2001 | Schneck et al. ................ | 707/1 |
| 6,237,006 B1 | * | 5/2001 | Weinberg et al. ........... | 345/419 |
| 6,256,631 B1 | * | 7/2001 | Malcolm ..................... | 707/710 |
| 6,484,149 B1 | * | 11/2002 | Jammes et al. ............... | 705/26 |

\* cited by examiner

*Primary Examiner*—Safet Metjahic
*Assistant Examiner*—Hanh Thai
(74) *Attorney, Agent, or Firm*—Julius B. Kraft; Thomas E. Tyson; Volel Emile

(57) ABSTRACT

The user receiving a World Wide Web (Web) page is provided with an implementation for predetermining subject matter, terms and words for which the user desires to have hyperlinks in a received web document. It further provides for displaying in the received web document multiple hyperlinks for each predetermined term of interest to thereby substantially reduce the user browsing through several levels of web documents in pursuit of topics of interest. Search engines for locating web documents related to the defined words are provided together with implementations for creating hyperlinks from the received web document to at least some of the located web documents. The system may be implemented by highlighting the defined words in the received web document, and responsive to a user interactive selection of a highlighted defined word in the received document, displaying a menu of a plurality of hyperlinks to the located web documents related to the selected highlighted defined word. The located predefined words may be highlighted in the form of word buttons. Also, the menu, of the plurality of hyperlinks, is to the most relevant of the located web documents related to the selected highlighted defined word.

21 Claims, 8 Drawing Sheets

US 6,848,077 B1

DYNAMICALLY CREATING HYPERLINKS TO OTHER WEB DOCUMENTS IN RECEIVED WORLD WIDE WEB DOCUMENTS BASED ON TEXT TERMS IN THE RECEIVED DOCUMENT DEFINED AS OF INTEREST TO USER

TECHNICAL FIELD

The present invention relates to computer managed communication networks such as the World Wide Web (Web) and, particularly, to systems, processes and programs for reducing users' time spent in accessing and browsing through numerous Web documents which may be of possible interest to the user.

BACKGROUND OF RELATED ART

The past decade has been marked by a technological revolution driven by the convergence of the data processing industry with the consumer electronics industry. The effect has, in turn, driven technologies which have been known and available but relatively quiescent over the years. A major one of these technologies is the Internet or Web related distribution of documents, media and programs. The convergence of the electronic entertainment and consumer industries with data processing exponentially accelerated the demand for wide ranging communication distribution channels, and the Web or Internet, which had quietly existed for over a generation as a loose academic and government data distribution facility, reached "critical mass" and commenced a period of phenomenal expansion. With this expansion, businesses and consumers have direct access to all matter of documents, media and computer programs.

In addition, Hypertext Markup Language (HTML), which had been the documentation language of the Internet or Web for years, offered direct hyperlinks between Web pages embedded in such Web pages. This even further exploded the use of the Internet or Web. It was now possible for the Web browser or wanderer to spend literally hours going through document after document in often less than productive excursions through the Web. These excursions often strained the users' time and resources. A significant source of this drain is in the Web page itself (the basic document page of the Web).

Web documents or pages have hyperlinks setting forth terms and topics which the user may interactively click on or select to access other Web documents which, in turn, respectively have their own hyperlinks selectable by the user to access the next Web documents. Thus, browsing through Web documents often involves the time consuming process of following a thread of hyperlinked Web documents through several levels of hyperlinks, then backing up to a Web document at an earlier level, selecting another hyperlink in that document and then following another thread of hyperlinked documents through several levels.

Web developers and users are continually seeking implementations to make this Web document browsing process less cumbersome and more user friendly.

SUMMARY OF THE PRESENT INVENTION

The present invention addresses these user needs by providing the user and developer with an implementation providing the user with a means for predetermining subject matter, terms and words for which the user desires to have hyperlinks in a received Web document. It further provides for displaying in the received Web document, multiple hyperlinks for each predetermined term of interest to thereby substantially reduce the user's browsing through several levels of Web documents in pursuit of topics of interest.

The present invention is implemented in a communication network such as the Web or Internet (used synonymously) with user access via a plurality of data processor controlled interactive receiving display stations for displaying received hypertext documents of at least one display page containing text, images and a plurality of embedded hyperlinks, each hyperlink being user selectable to access and display a respective linked hypertext document (Web page).

It provides a system comprising means at a receiving display station for predefining words in a received Web document of interest to a user of said receiving display station in combination with search means for locating Web documents related to said defined words, and means for creating hyperlinks from said received Web document to at least some of the located Web documents. The system may be implemented by a means for highlighting said defined words in said received Web document, and means responsive to a user interactive selection of a highlighted defined word in said received document for displaying a menu of a plurality of hyperlinks to said located Web documents related to said selected highlighted defined word. The located predefined words may be highlighted in the form of word buttons. Also, the menu, of the plurality of hyperlinks, is to the most relevant of said located Web documents related to said selected highlighted defined word. Processes for ranking hyperlinks to Web documents based upon relevancy of the documents are available in existing art, as will be discussed in greater detail hereinafter in the description of the embodiment of the invention. One basic general process for such ranking is based solely on the frequency with which the Web document is accessed or "hit".

In the interest of avoiding completely cluttering the received document, only a few of the multiple hyperlinks related to a defined word button are displayed in the menu at one time. However, it will be understood that once the user has viewed and used the hyperlinks on a particular word button menu, he may request more hyperlinks related to the word button and the next set of hyperlinks will be listed on the menu. These may be the hyperlinks to the next most relevant word button, e.g. most frequently accessed of said located Web documents related to said word button. The means for defining words of interest may include a stored library of said words.

Also, the means for defining words of interest may include means for defining all proper names in said received Web document. Since proper names such as names of people, institutions and businesses are likely to locate a substantial number of related Web documents, the predefined terms desired by the user at a receiving station may be all of the proper names in the received document. Thus, there will be provided hyperlinks to documents connected with each of the proper names, and the user may then select to pursue documents connected with certain of the proper names.

It should be noted that the capability of this invention to define categories of words, such as proper names, includes the capability to exclude certain proper names which the user has no interest in. For example, the word definition may be all proper names except "Smith and Jones".

The present invention may be conveniently implemented in the browser serving the receiving display station which, in addition to having the means for defining said words of interest in a received Web document and the means for creating hyperlinks from said received Web document to at least some of the located Web documents, would also have means for accessing the search means.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
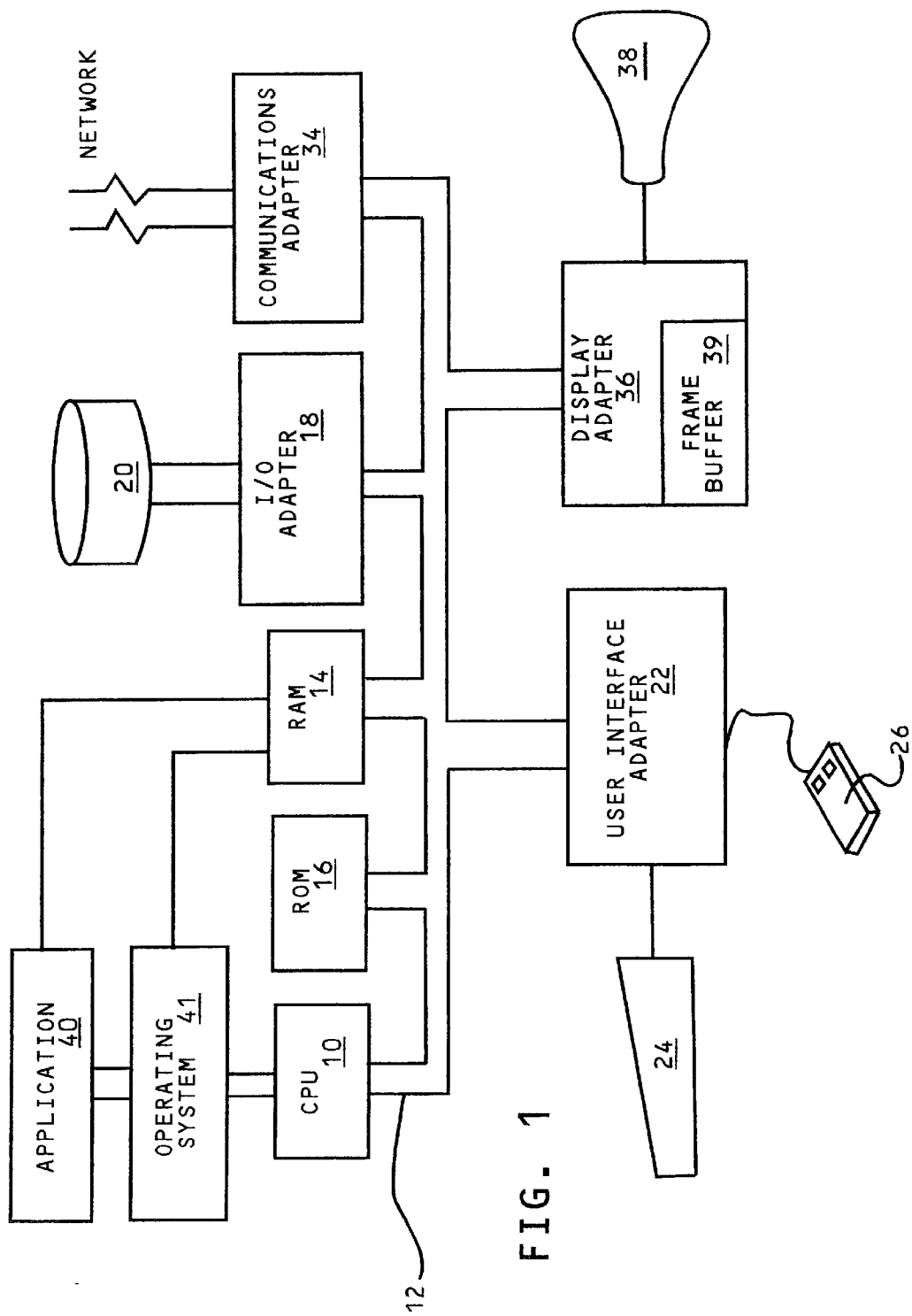
FIG. 1 is a block diagram of a data processing system including a central processing unit and network connections via a communications adapter which is capable of implementing the receiving display station on which the World Wide Web documents are provided with dynamically created additional hyperlinks in accordance with the present invention.

Referring to FIG. 1, a typical data processing terminal is shown which may function as the Web display stations used for receiving Web pages, for requesting Web searches and for Web browsing.

A central processing unit (CPU) 10, such as one of the PC microprocessors or workstations, e.g. RISC System/6000™ (RS/6000) series available from International Business Machines Corporation (IBM), is provided and interconnected to various other components by system bus 12. An operating system 41 runs on CPU 10, provides control and is used to coordinate the function of the various components of FIG. 1. Operating system 41 may be one of the commercially available operating systems such as the AIX 6000™ operating system available from IBM; Microsoft's Windows98™ or Windows NT™, as well as UNIX and AIX operating systems. Application programs 40, controlled by the system, are moved into and out of the main memory Random Access Memory (RAM) 14. These programs include the programs of the present invention for dynamically creating additional hyperlinks on received documents to other hypertext documents related to user predefined terms of interest, to be subsequently described in combination with any conventional Web browser, such as the Netscape Navigator 3.0™ or Microsoft's Internet Explorer™. A Read Only Memory (ROM) 16 is connected to CPU 10 via bus 12 and includes the Basic Input/Output System (BIOS) that controls the basic computer functions. RAM 14, I/O adapter 18 and communications adapter 34 are also interconnected to system bus 12. I/O adapter 18 may be a Small Computer System Interface (SCSI) adapter that communicates with the disk storage device 20. Communications adapter 34 interconnects bus 12 with an outside network enabling the data processing system to communicate with other such systems over a Local Area Network (LAN) or a Wide Area Network (WAN), which includes, of course, the Web or Internet. The latter two terms are meant to be generally interchangeable and are so used in the present description of the distribution network. I/O devices are also connected to system bus 12 via user interface adapter 22 and display adapter 36. Keyboard 24 and mouse 26 are all interconnected to bus 12 through user interface adapter 22. It is through such input devices that the user may interactively relate to Web pages. Display adapter 36 includes a frame buffer 39, which is a storage device that holds a representation of each pixel on the display screen 38. Images may be stored in frame buffer 39 for display on monitor 38 through various components; such as a digital to analog converter (not shown) and the like. By using the aforementioned I/O devices, a user is capable of inputting information to the system through the keyboard 24 or mouse 26 and receiving output information from the system via display 38.

Before going further into the details of specific embodiments, it will be helpful to understand from a more general perspective the various elements and methods which may be related to the present invention. Since the major aspect of the present invention is directed to Web pages transmitted over global networks, such as the Web or Internet, an understanding of networks and their operating principles would be helpful. We will not go into great detail in describing the networks to which the present invention is applicable. For details on Web nodes, objects and links, reference is made to the text, *Mastering the Internet*, G. H. Cady et al., published by Sybex Inc., Alameda, Calif., 1996; or the text, *Internet: The Complete Reference, Millennium Edition*, Margaret Young et al., Osborne/McGraw-Hill, Berkeley, Calif., 1999. Any data communication system which interconnects or links computer controlled systems with various sites defines a communications network. Of course, the Internet or Web is a global network of a heterogeneous mix of computer technologies and operating systems. Higher level objects are linked to the lower level objects in the hierarchy through a variety of network server computers.

Web documents are conventionally implemented in HTML language, which is described in detail in the text entitled *Just Java*, van der Linden, 1997, SunSoft Press, particularly at Chapter 7, pp. 249–268, dealing with the handling of Web pages; and also in the above-referenced *Mastering the Internet*, particularly pp. 637–642, on HTML in the formation of Web pages.

In addition, aspects of this invention will involve Web browsers. A general and comprehensive description of browsers may be found in the above-mentioned *Mastering the Internet* text at pp. 291–313. More detailed browser descriptions may be found in the above-mentioned *Internet: The Complete Reference, Millennium Edition* text at Chapter 19, pp. 419–454, on the Netscape Navigator; Chapter 20, pp. 455–494, on the Microsoft Internet Explorer; and Chapter 21, pp. 495–512, covering Lynx, Opera and other browsers.

The invention involves the use of search engines for searching. As described in the above-mentioned *Internet: The Complete Reference, Millennium Edition* text, pp. 395 and 522–535, search engines use keywords and phrases to query the Web for desired subject matter. Usually the keywords are combined with some of the basic Boolean operators, i.e. AND, OR and NOT, in designing Web queries. Each search engine has its own well developed syntax or rules for combining such Boolean operators with the keywords to conduct the searches. The search engine is a database application that retrieves information according to its own syntax. The search engine usually uses a search agent called a "spider" that looks for information on Web pages. Such information is indexed and stored in a vast database. In carrying out its search, the search engine looks through the database for matches to keywords subject to the engine syntax. The search engine then presents to the user a list of the Web pages it determines to be closest to the requested query. Some significant search engines are: AltaVista, Infoseek, Lycos, Magellan, Webcrawler and Yahoo.

Figure 2:
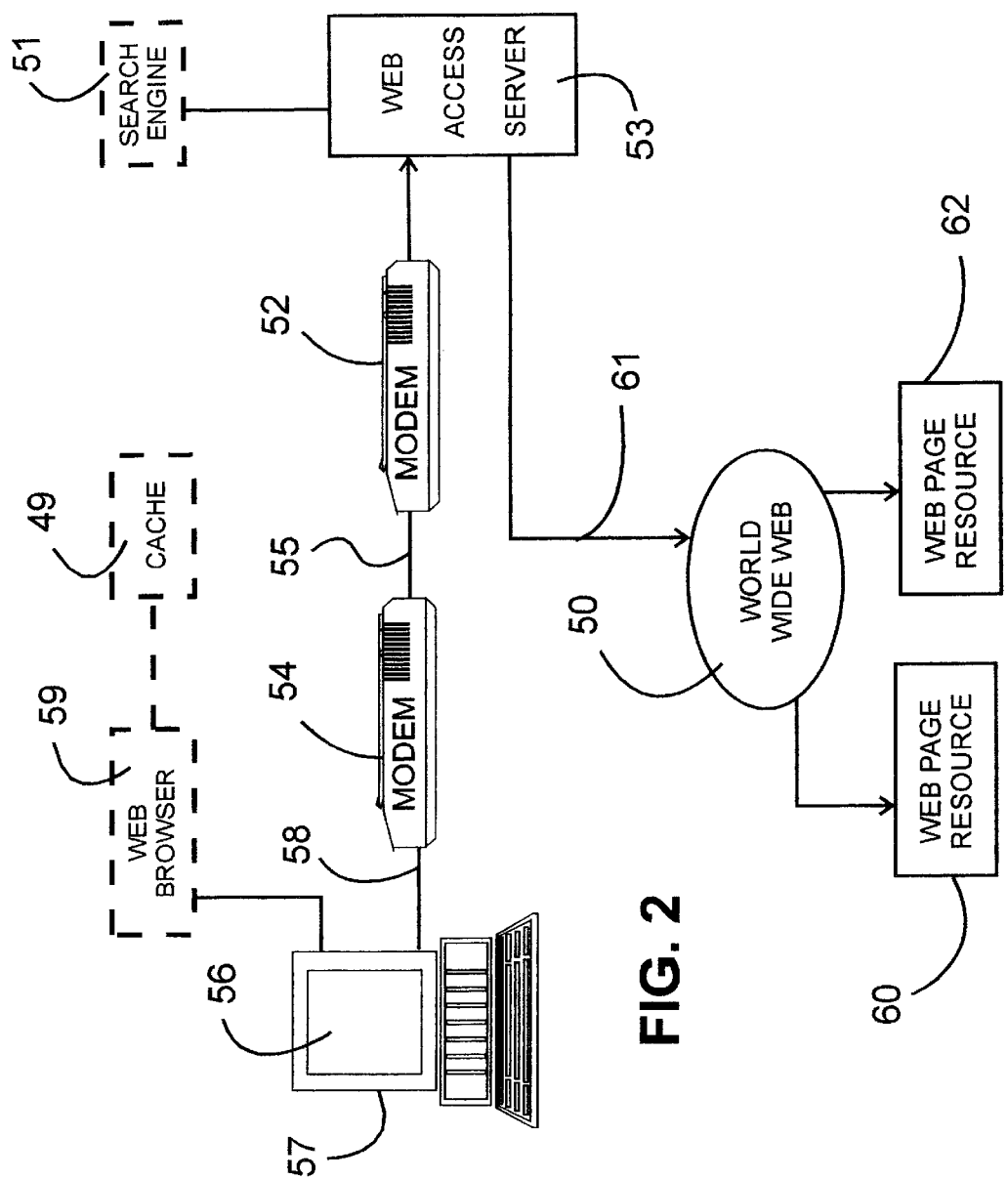
FIG. 2 is a generalized diagrammatic view of a World Wide Web portion upon which the present invention may be implemented.

A generalized diagram of a portion of the Web, to which the computer controlled display terminal 57 used for Web page receiving during searching or browsing, is connected as shown in FIG. 2. Computer display terminal 57 may be implemented by the computer system setup in FIG. 1 and connection 58 (FIG. 2) is the network connection shown in FIG. 1. For purposes of the present embodiment, computer 57 serves as a Web display station and has received displayed Web page 56, which is one of a sequence of Web pages containing an embedded hyperlink to other Web pages.

Reference may be made to the above-mentioned *Mastering the Internet*, pp. 136–147, for typical connections between local display stations to the Web via network servers, any of which may be used to implement the system on which this invention is used. The system embodiment of FIG. 2 has a host-dial connection. Such host-dial connections have been in use for over 30 years through network access servers 53 which are linked 61 to the Web 50. The servers 53 may be maintained by a service provider to the client's display terminal 57. The host's server 53 is accessed by the client terminal 57 through a normal dial-up telephone linkage 58 via modem 54, telephone line 55 and modem 52. The HTML file representative of the Web page 56 has been downloaded to display terminal 57 through Web access server 53 via the telephone line linkages from server 53, which may have accessed them from the Internet 50 via linkage 61. The Web browser program 59 operates within the display terminals 57 to control the communication with the Web access server 53 to thereby download and display the accessed Web pages 56 on terminal 57. The Web access server 53 uses one of the previously described search engines 51 to access via the Web 50 the desired sequence of Web pages from appropriate Web resources such as databases 60 and 62.

Figure 3:
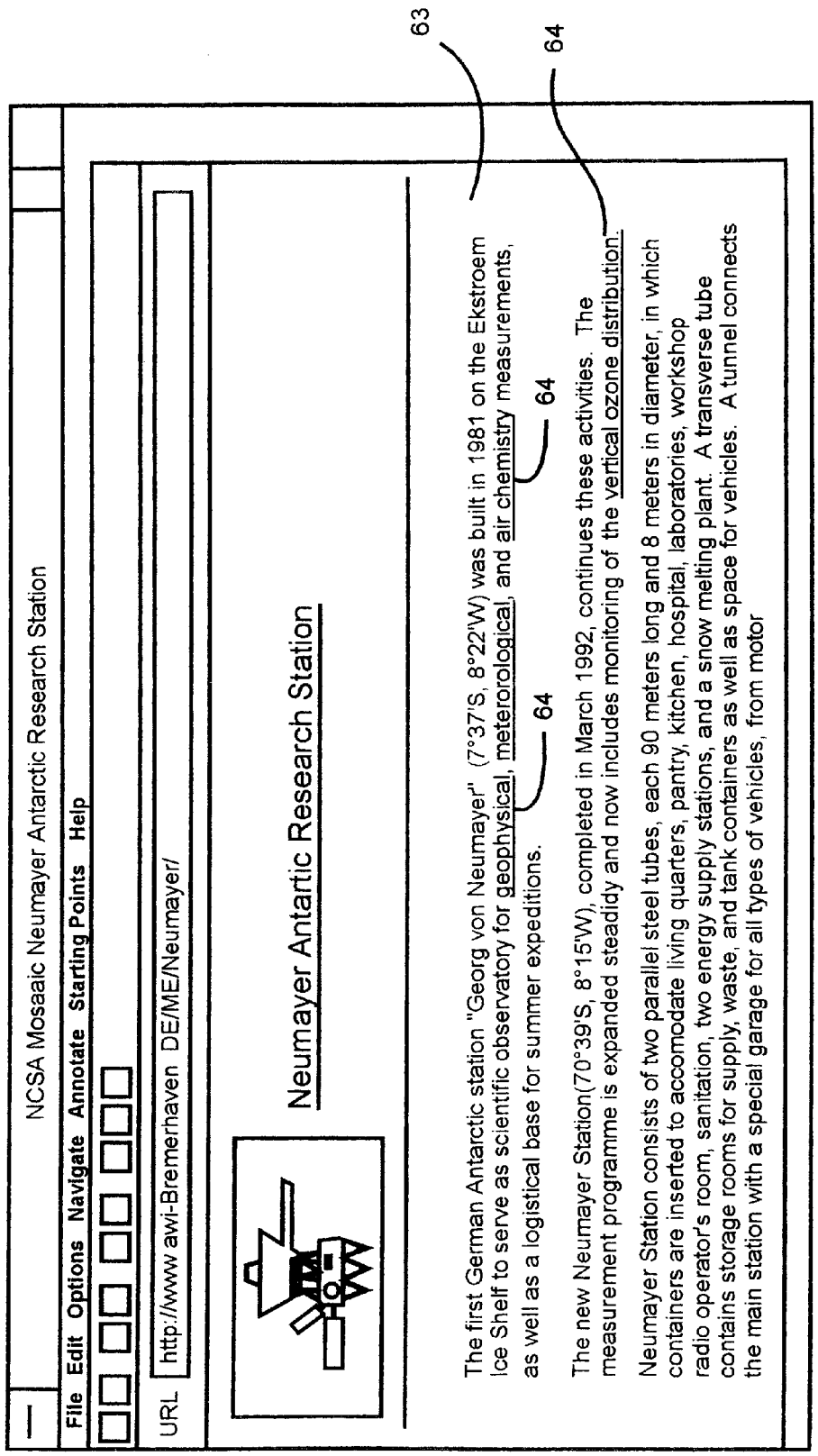
FIG. 3 is a diagrammatic view of a World Wide Web page displayed at a receiving display station with the original hyperlinks in the page underlined.

With this setup, the present invention, which will be subsequently described in greater detail with respect to FIGS. 3 through 6, may be carried out using Web browser 59 and associated cache 49 (FIG. 2). Search engine 51 accesses the sequence of Web pages and provides such pages to the user at terminal 57. Web document, page 63, FIG. 3, is an illustration of the displayed Web page 56 in FIG. 2. This standard page contains text, graphics and images, as well as hyperlinks 64 to other Web documents. These hyperlinks are emphasized, for example, by underlining, by color or brightness. When the user selects one of the hyperlinks by clicking on it, the browser program accesses the linked document from the Web through the document's URL and displays the accessed Web document.

Figure 4:
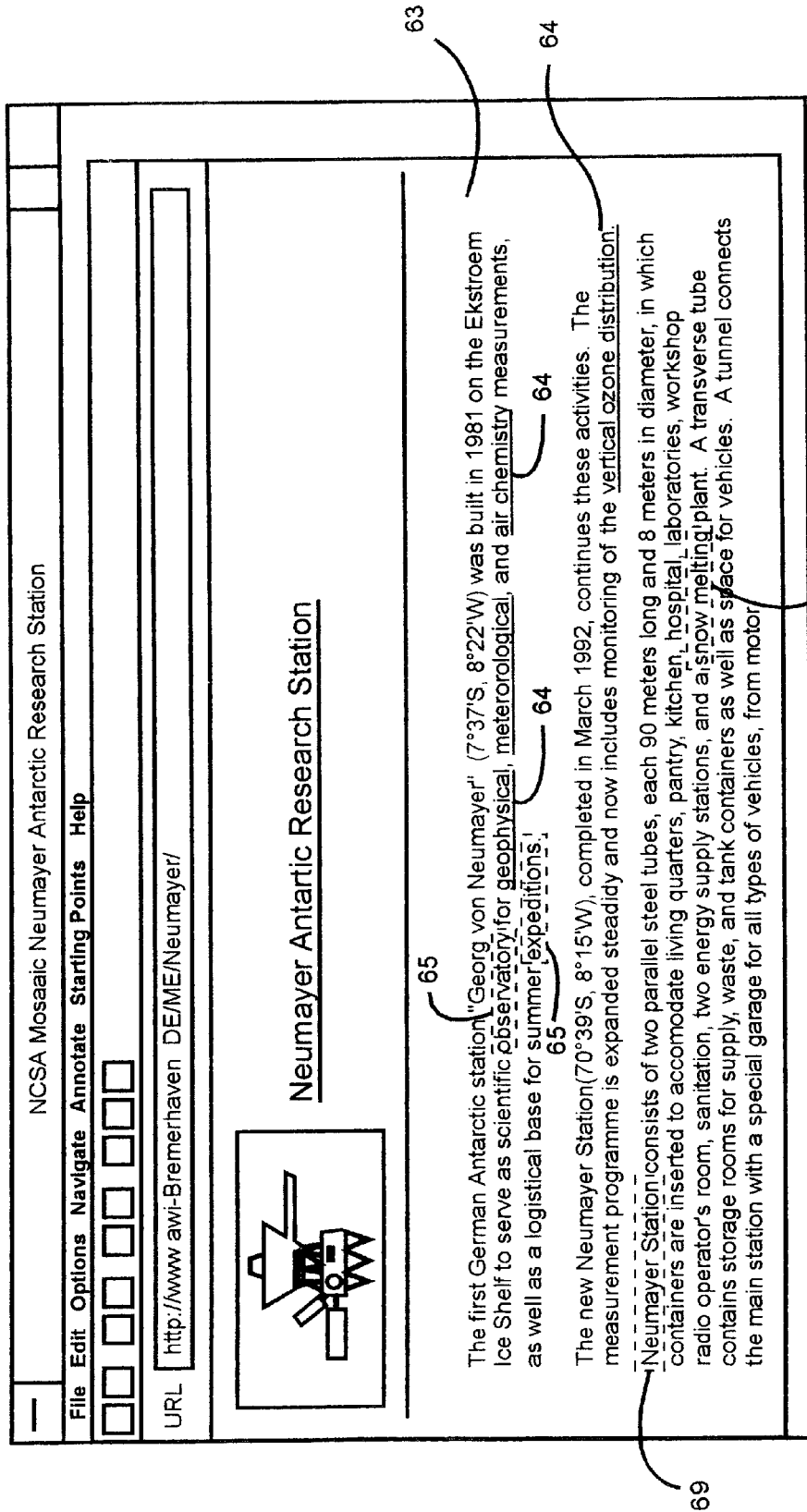
FIG. 4 is the diagrammatic display view of the World Wide Web page of FIG. 3 with the words or terms which match user predefined words of interest enclosed by dotted lines.
Figure 5:
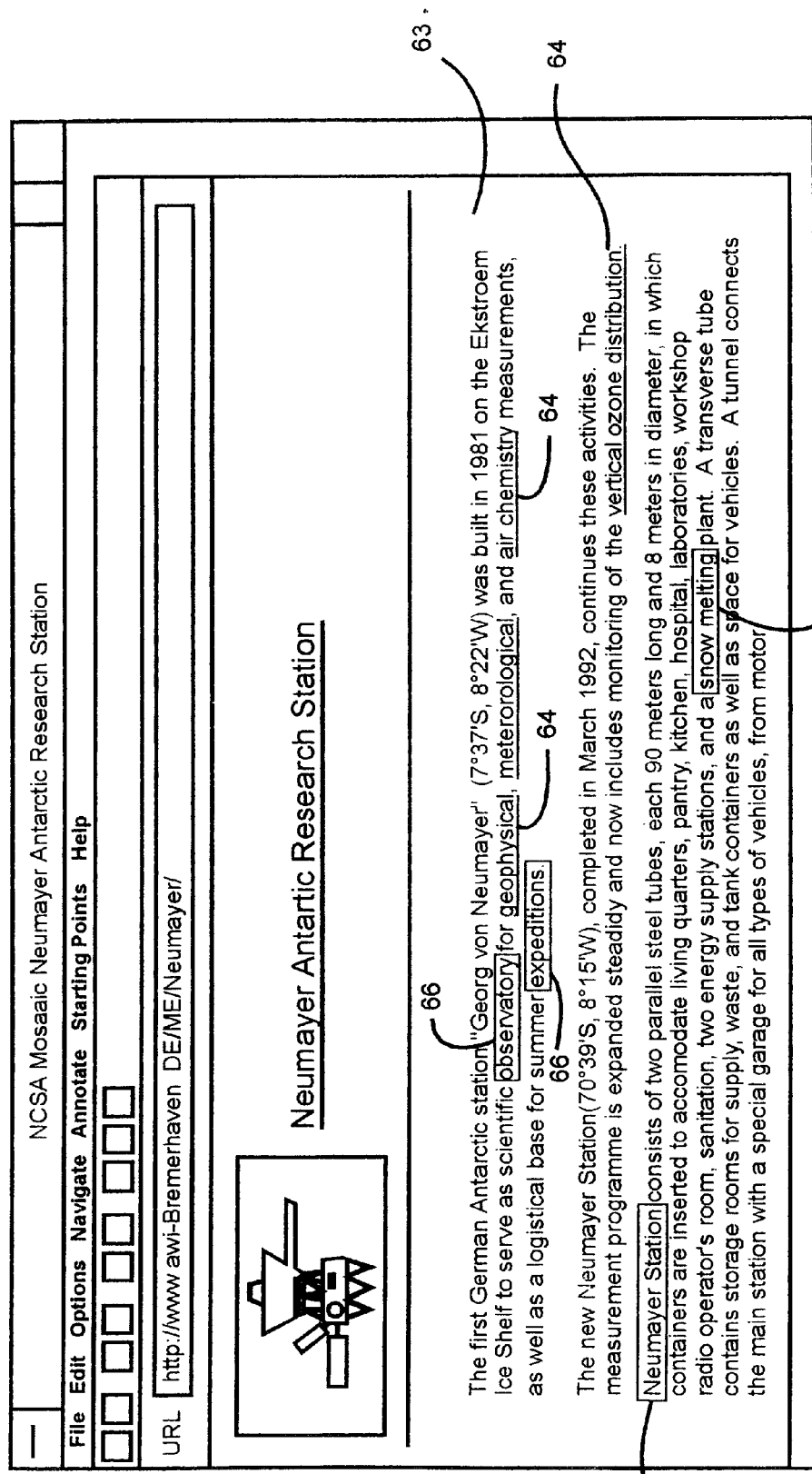
FIG. 5 is the diagrammatic display view of the World Wide Web page of FIG. 4 with the words or terms which match user predefined words of interest now shown as word buttons.
Figure 6:
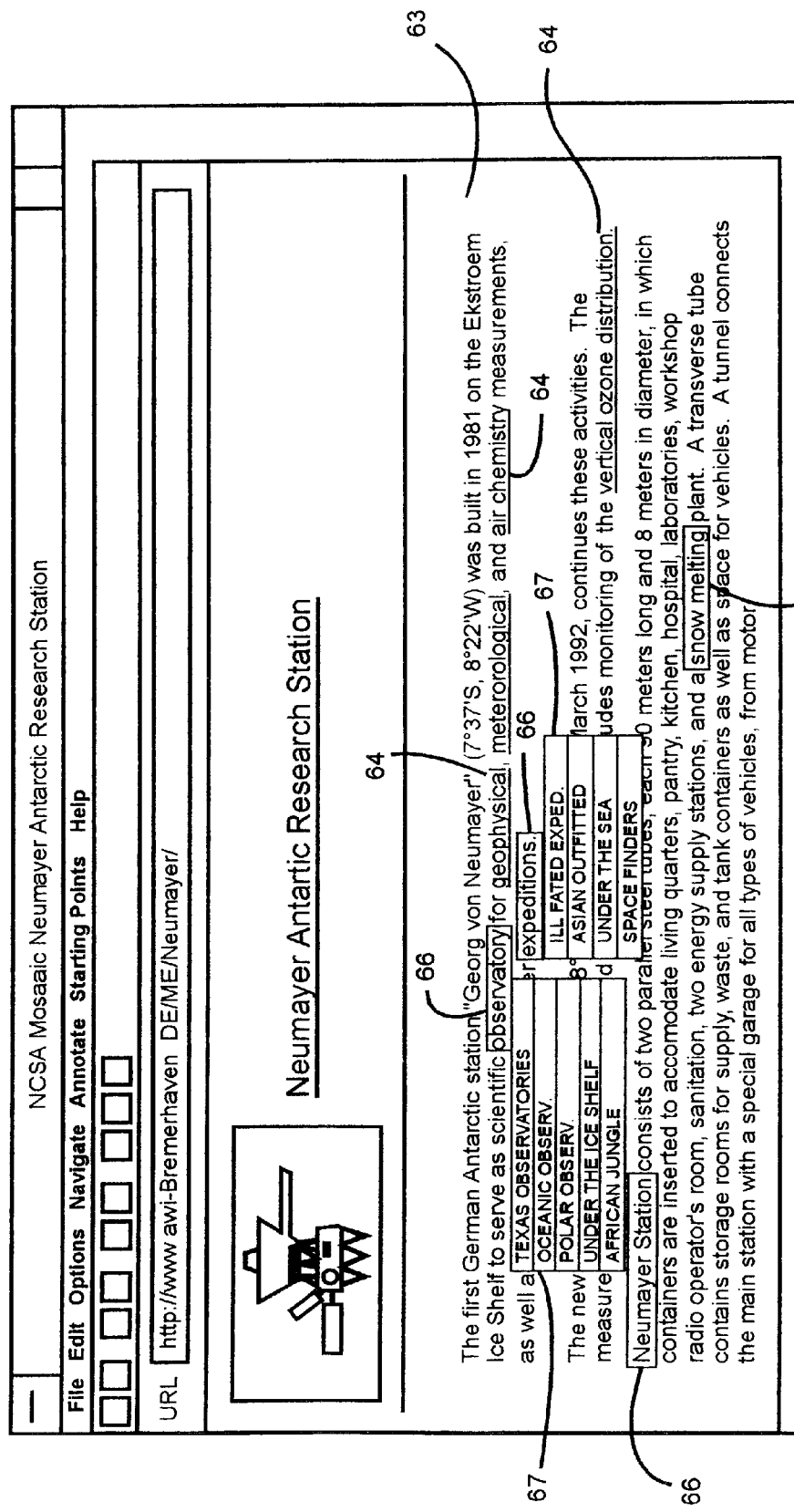
FIG. 6 is the diagrammatic display view of the World Wide Web page of FIG. 5 after some of the word buttons have been selected and their respective menus of hyperlinks have appeared in drop-down menus.

In the present invention, the user has predefined words and terms of interest. These words and terms and/or the rules for finding such words and terms are stored at the receiving display station. They could be conveniently stored in cache 49, particularly if the user is a temporary user of the receiving display station. The words and terms may be set up in a stored library. Thus, when a Web page is received the browser program compares the text of page 63 to the predefined terms of interest. In FIG. 4, outlined words or terms 65 have compared to the stored terms of interest. Also term 69, a proper name, has met a stored rule which requests all proper names. The browser now has Web searches done through search engines 51, FIG. 2, on terms 66 and name 69 and search results are stored at the receiving display station, e.g. at browser cache 49. Also, the terms and names are highlighted 66, FIG. 5, to indicate that these are stored in connection with each additional hyperlink to Web documents. This highlighting may be conveniently in the form of the word buttons 66. When the user selects a word button 66 as the user has done twice in FIG. 6, menus 67 displaying some of the most relevant hyperlinks to documents related to the button words 66 drop down. The user may then select any hyperlink in menus 67, as well as standard hyperlinks 64. Processes for ranking hyperlinks to Web documents based upon relevancy of the documents are available in existing art. Most search engines provide some manner of relevancy ranking. Some factors which may be involved in relevancy ranking are how often the search term appears in the located Web page and where the search word appears, e.g. in the page headers or in some insignificant portion of the page. A simpler general process for such ranking is based solely on the frequency with which the Web page or document is accessed or "hit". For further details on such relevancy ranking, reference may be made to the text, *The Web Navigator*™, Paul Gilster, John Wiley and Sons Inc., New York, 1997, particularly at pp. 325–326.

Figure 7:
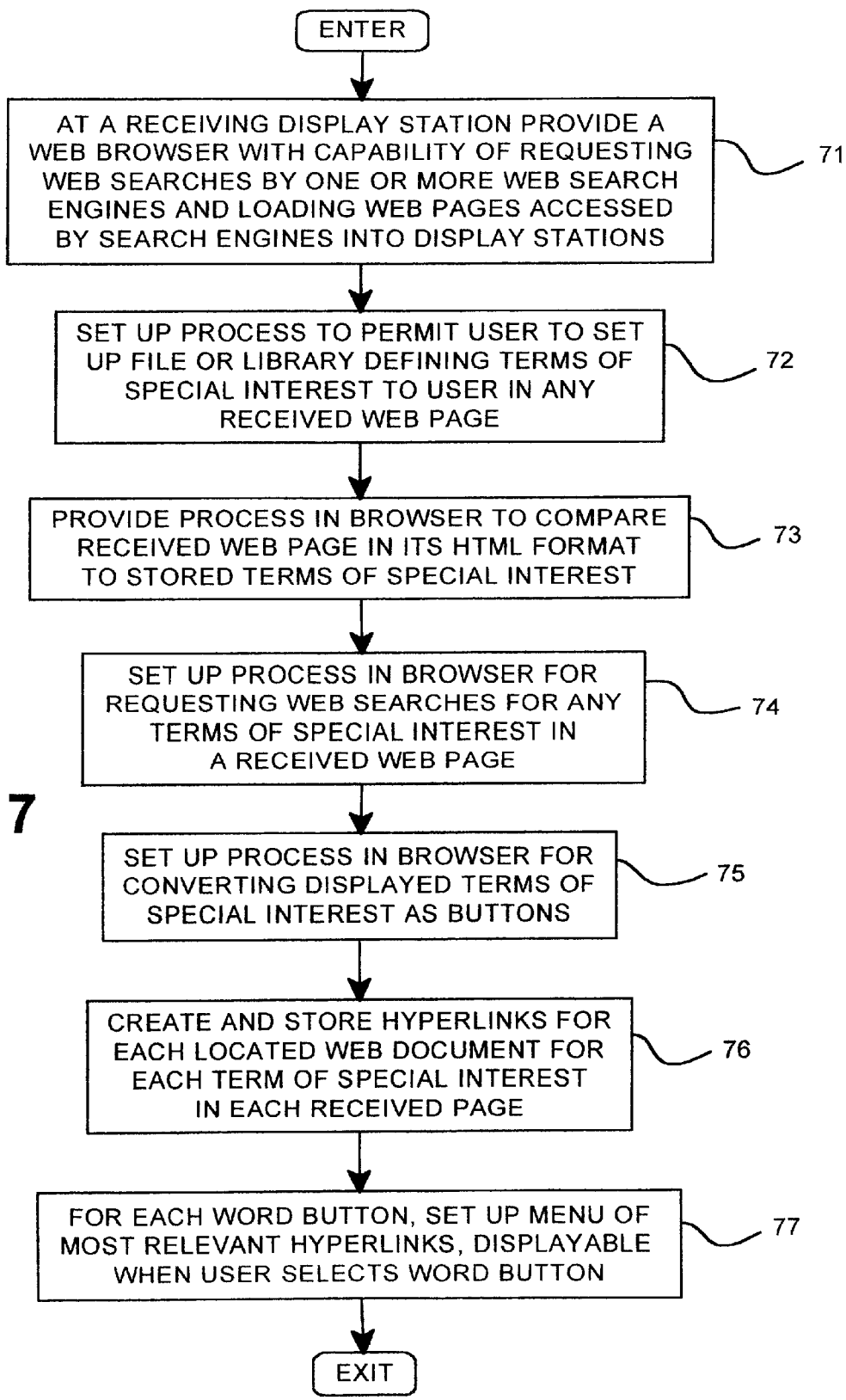
FIG. 7 is an illustrative flowchart describing the setting up of the process of the present invention for dynamically creating additional hyperlinks of interest to the users of received World Wide Web documents.

FIG. 7 is a flowchart showing the development of a process according to the present invention for dynamically creating additional hyperlinks from a received Web page to Web pages related to user predefined words and terms of interest. Most of the programming functions in the process of FIG. 7 have already been described in general with respect to FIGS. 3 through 6. A Web browser is provided at a receiving display station on the Web for accessing Web pages in the conventional manner and loading them at the display station, step 71. The Web browser has the capability of requesting searches from one or more search engines available through the Web. A process is provided to permit the user to predefine words and terms of special interest to the user at the receiving station. These words of special interest could be in a library accessible through the browser which could conveniently be in the browser cache, step 72. A process is provided, conveniently in the browser, for comparing the received Web page in its HTML format to the stored words of special interest, step 73. A process is also set up in the browser for requesting Web searches for any words or terms of special interest found in the received Web page, step 74. A process is provided for converting words of special interest in the received Web page into selectable word buttons, step 75. Hyperlinks between the received Web page and each Web page or document located in the searches for each word of special interest, step 76. There is set up a process to provide for each word button, a menu of some of the most relevant hyperlinks to the word-related Web pages or documents. Each menu is displayable when the user selects a respective word button. The relevancy ranking of the hyperlinks in setting up these menus has been discussed above.

Figure 8:
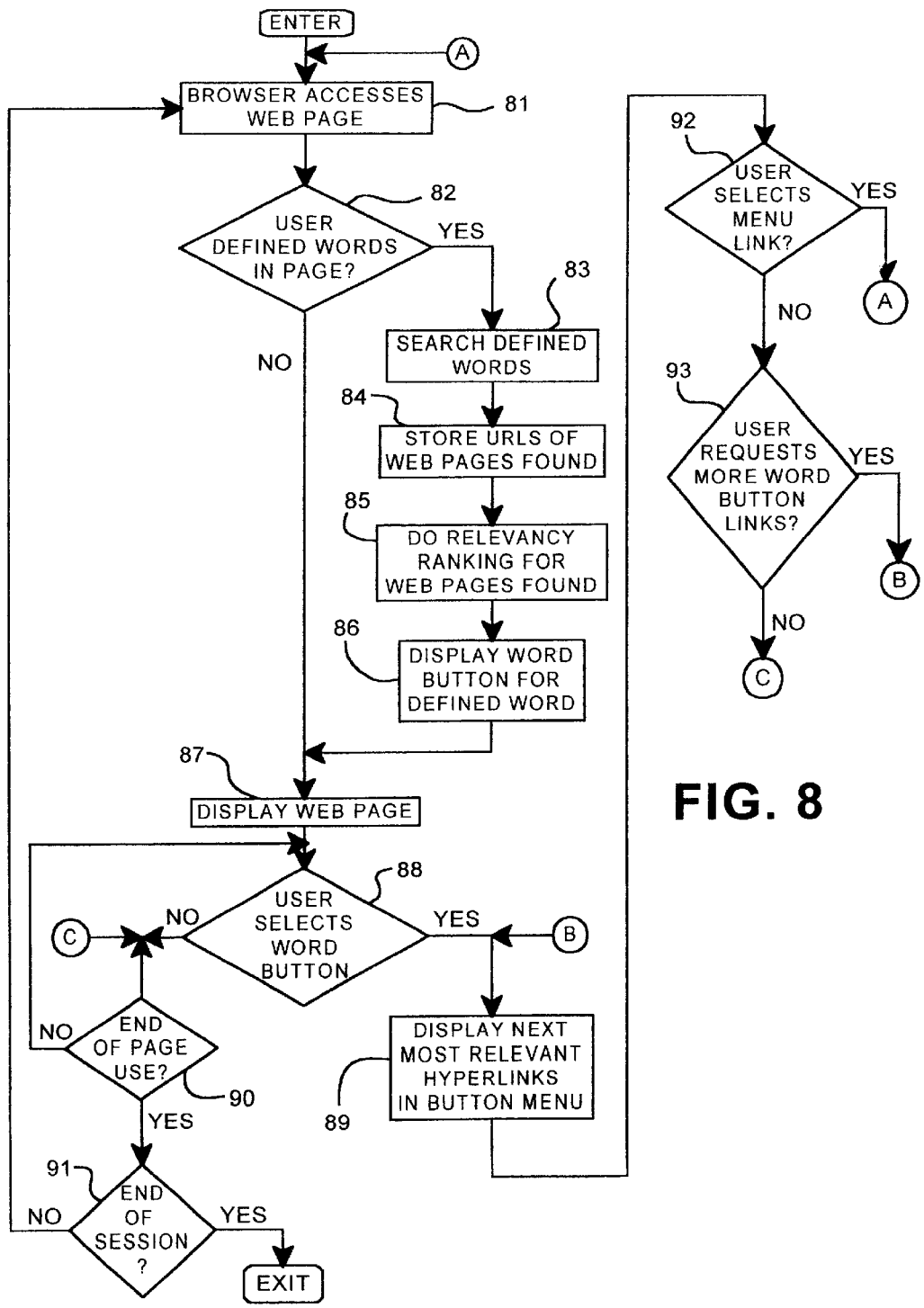
FIG. 8 is a flowchart of an illustrative run of the process setup in FIG. 7.

The running of the process setup in FIG. 7 and described in connection with FIGS. 3 through 6 will now be described with respect to the flowchart of FIG. 8. Let us assume that we are in a Web browsing session through the browser. The flowchart represents some steps in a routine which will illustrate the operation of the invention. The browser accesses the pages found by a search engine; the next Web page is accessed, step 81. A determination is made as to whether the received page contains any user predefined words, step 82. If Yes, searches for Web pages are carried out for each defined word found in a received page, step 83, and the URLs of the located Web pages are stored, step 84. For each defined word searched, the located Web pages are ranked for relevancy as described above, step 85. A word button is displayed for each defined word in the received Web page, step 86. The received Web page is displayed, step 87, as it would have been directly displayed if the decision from step 82 indicated No defined words in the received page. At this point, a determination is made as to whether the user has selected a word button, step 88. If Yes, there is displayed, step 89, as a drop down menu in connection with the selected word button, the next group of most relevant hyperlinks. By the "next group" is meant either the initial group or, if the user pushes the word button, a second time or a next time, then the next most relevant group of hyperlinks is displayed in the menu. If the user does not select a word button, then he may continue to work with the page, i.e. a No decision from next step 90 which returns the process to step 88 where the next word button selection is awaited. A Yes decision from step 90 indicates that the user has finished with the page and then a further determination is made, step 91, as to whether the session is at an end. If NO, then the process branches back to step 81 and the next page is accessed. If the decision from step 91 is Yes, then the session is exited.

Returning now to the displayed menus of step 89, if the user selects a hyperlink from a menu, Yes from decision step 92, the process branches back to step 81 via branch "A", the new selected page from the selected hyperlink is accessed and processed by the user. If No, then a determination is made, step 93, as to whether the user has selected to access the next most relevant hyperlinks for the displayed menu under the word button. If No, the process is returned to step 90 via branch "C" and an end of page determination is made as previously described. If the decision from step 93 is Yes, more hyperlinks for the word button will be displayed, then the process is returned via branch "B" to step 89 where the next most relevant set of hyperlinks for the word button are displayed.

One of the preferred implementations of the present invention is in application program 40, i.e. a browser program made up of programming steps or instructions resident in RAM 14, FIG. 1, of a Web receiving station during various Web operations. Until required by the computer system, the program instructions may be stored in another readable medium, e.g. in disk drive 20, or in a removable memory, such as an optical disk for use in a CD ROM computer input or in a floppy disk for use in a floppy disk drive computer input. Further, the program instructions may be stored in the memory of another computer prior to use in the system of the present invention and transmitted over a LAN or a WAN, such as the Web itself, when required by the user of the present invention. One skilled in the art should appreciate that the processes controlling the present invention are capable of being distributed in the form of computer readable media of a variety of forms.

Although certain preferred embodiments have been shown and described, it will be understood that many changes and modifications may be made therein without departing from the scope and intent of the appended claims.

What is claimed is:

1. In a World Wide Web communication network with user access via a plurality of data processor controlled interactive receiving display stations for displaying received hypertext documents of at least one display page containing text, images and a plurality of embedded hyperlinks to hypertext documents accessible from sources on the World Wide Web, a system for dynamically creating additional hyperlinks on received documents to other hypertext documents comprising:

means at a receiving display station for defining words in a received World Wide Web document of interest to a user of said receiving display station, search means for locating World Wide Web documents related to said defined words, means for creating hyperlinks from said received World Wide Web documents to at least some of the located Web documents, means for highlighting said defined words in said received World Wide Web documents, and means responsive a user interactive selection of a highlighted defined word in said received document for displaying menu of a plurality of hynerlinks to said located World Wide Web documents related to said selected highlighted defined word.

2. The network system of claim 1 wherein said defined words are highlighted in the form of word buttons.

3. The network system of claim 1 wherein said menu of a plurality of hyperlinks is to the most relevant of said located World Wide Web documents related to said selected highlighted defined word.

4. The network system of claim 3 wherein the relevancy of said located documents is based upon the most frequently accessed of said located World Wide Web documents.

5. The network system of claim 1 wherein said means for defining words of interest include a stored library of said words.

6. The network system of claim 1 wherein said means for defining words of interest include means for defining all proper names in said received World Wide Web document.

7. The network system of claim 1 further comprising:

World Wide Web browsing means at said receiving display station including:

said means for defining said words of interest in a received World Wide Web document;

means for accessing said search means; and said means for creating hyperlinks from said received World Wide Web document to at least some of the located World Wide Web documents.

8. In a World Wide Web communication network with user access via a plurality of data processor controlled interactive receiving display stations for displaying received hypertext documents of at least one display page containing text, images and a plurality of embedded hyperlinks to hypertext documents accessible from sources on the World Wide Web, a method for dynamically creating additional hyperlinks on received documents to other hypertext documents comprising:

defining, at a receiving display station, words in a received World Wide Web document of interest to a user of said receiving display station, searching to locate World Wide Web documents related to said defined words, creating hyperlinks from said received World Wide Web documents to at least some of the located Web documents, highlighting said defined words aid received World Wide Web document, and responsive to a user interactive selection of a high-lighted defined word in said receive document, displaying a menu of a plurality of hyperlinks to said located World Wide Web documents related to said selected highlighted defined word.

9. The method of claim 8 including the step of highlighting said defined words in the form of word buttons.

10. The method of claim 8 wherein said menu of a plurality of hyperlinks are to the most relevant of said located World Wide Web documents related to said selected highlighted defined word.

11. The method of claim 10 wherein the relevancy of said located documents is based upon the most frequently accessed of said located World Wide Web documents.

12. The method of claim 8 wherein said step of defining words of interest includes the step of comparing the text in said received document to a stored library of said words.

13. The method of claim 8 wherein said step of defining words of interest includes the step of defining all proper names in said received World Wide Web document.

14. The method of claim 10 further comprising:

a World Wide Web browsing process at said receiving display station including:
said step of defining said words of interest in a received World Wide Web document;
accessing said search means; and
said step of creating hyperlinks from said received World Wide Web document to at least some of the located World Wide Web documents.

15. A computer program having code recorded on a computer readable medium for dynamically creating additional hyperlinks between a World Wide Web hypertext document, received at a World Wide Web display station, and other hypertext Web documents comprising:

means for defining words in a received World Wide Web document of interest to a user of said receiving display station, search means for locating World Wide Web documents related to said defined words, means for creating hyperlinks from said received World Wide Web documents to least some of the located Web documents, means for highlighting said defined words in said received World Wide Web document, and means responsive to a user interactive selection of a highlighted defined word said receive document for displaying a menu of a plurality of hyperlinks to said located World Wide Web documents related to said selected highlighted defined word.

16. The computer program of claim 15 wherein said defined words are highlighted in the form of word buttons.

17. The computer program of claim 15 wherein said menu of a plurality of hyperlinks are to the most relevant of said located World Wide Web documents related to said selected highlighted defined word.

18. The computer program of claim 17 wherein the relevancy of said located documents is based upon the most frequently accessed of said located World Wide Web documents.

19. The computer program of claim 15 wherein said means for defining words of interest include a stored library of said words.

20. The computer program of claim 16 wherein said means for defining words of interest include means for defining all proper names in said received World Wide Web document.

21. The computer program of claim 15 further comprising:

World Wide Web browsing means at said receiving display station including:
said means for defining said words of interest in a received World Wide Web document;
means for accessing said search means; and
said means for creating hyperlinks from said received World Wide Web documents to at least some of the located Web documents.

* * * * *